US009554516B2

(12) United States Patent
Thompson et al.

(10) Patent No.: US 9,554,516 B2
(45) Date of Patent: Jan. 31, 2017

(54) APPARATUS AND METHODS FOR GATHERING BALES

(71) Applicant: Forage Innovations B.V., Maassluis (NL)

(72) Inventors: Kent Thompson, Otley, IA (US); Darin Dux, Pella, IA (US)

(73) Assignee: FORAGE INNOVATIONS B.V., Maassluis (NL)

( * ) Notice: Subject to any disclaimer, the term of this patent is extended or adjusted under 35 U.S.C. 154(b) by 361 days.

(21) Appl. No.: 13/918,273

(22) Filed: Jun. 14, 2013

(65) Prior Publication Data

US 2014/0003886 A1 Jan. 2, 2014

Related U.S. Application Data

(60) Provisional application No. 61/665,752, filed on Jun. 28, 2012.

(51) Int. Cl.
*A01D 90/08* (2006.01)
*A01D 90/02* (2006.01)
*B60P 1/36* (2006.01)

(52) U.S. Cl.
CPC ............. *A01D 90/02* (2013.01); *A01D 90/083* (2013.01); *B60P 1/36* (2013.01)

(58) Field of Classification Search
CPC .......... A01D 90/02; A01D 90/083; B60P 1/36
USPC ............... 414/111, 24.5, 812, 480, 486, 489, 491,414/497, 499, 507, 528, 537; 198/301, 309, 198/312, 314
See application file for complete search history.

(56) References Cited

U.S. PATENT DOCUMENTS

| | | | |
|---|---|---|---|
| 2,761,577 A | 9/1956 | Lahman | |
| 3,209,932 A | 10/1965 | Schiltz | |
| 3,341,039 A * | 9/1967 | Cranage | 414/523 |
| 3,366,257 A | 1/1968 | Strom | |
| 3,415,400 A | 12/1968 | Olin | |
| 3,952,895 A | 4/1976 | Campbell | |
| 4,019,643 A | 4/1977 | Kampman et al. | |
| 4,053,070 A * | 10/1977 | Rozeboom | 414/492 |
| 4,072,241 A | 2/1978 | Parker et al. | |
| 4,084,707 A | 4/1978 | McFarland | |
| 4,101,081 A * | 7/1978 | Ritter et al. | 241/101.74 |
| 4,103,794 A * | 8/1978 | Shaw | 414/501 |
| 4,248,561 A | 2/1981 | Graves | |
| 4,261,676 A * | 4/1981 | Balling, Sr. | 414/24.5 |
| 4,329,101 A | 5/1982 | Green et al. | |
| 4,329,102 A | 5/1982 | Gray | |
| 4,376,607 A | 3/1983 | Gibson | |

(Continued)

FOREIGN PATENT DOCUMENTS

EP 0317670 A1 5/1989
FR 2569631 A1 3/1986

(Continued)

OTHER PUBLICATIONS

International Search Report, Application No. PCT/NL2013/050461, dated Apr. 28, 2014, pp. 3.

(Continued)

*Primary Examiner* — Michael McCullough
*Assistant Examiner* — Lynn Schwenning
(74) *Attorney, Agent, or Firm* — Armstrong Teasdale LLP

(57) ABSTRACT

Apparatus and methods which use a conveyored loading assembly for gathering bales and, in particular, round bales such as a hay or corn stover bales.

18 Claims, 15 Drawing Sheets

(56) References Cited

U.S. PATENT DOCUMENTS

| | | |
|---|---|---|
| 4,396,331 A | 8/1983 | Forster |
| 4,411,573 A | 10/1983 | Townsend |
| 4,498,829 A | 2/1985 | Spikes |
| 4,630,986 A | 12/1986 | Taylor |
| 4,718,806 A | 1/1988 | Chambers |
| 4,938,646 A | 7/1990 | Elias et al. |
| 4,952,111 A | 8/1990 | Callahan |
| 4,971,504 A | 11/1990 | Klompien |
| 5,028,085 A * | 7/1991 | Dudley, Jr. .................. 294/107 |
| 5,062,757 A | 11/1991 | Eichenauer |
| 5,288,193 A | 2/1994 | Warburton et al. |
| 5,320,472 A | 6/1994 | Matlack et al. |
| 5,340,259 A | 8/1994 | Flaskey |
| 5,405,229 A | 4/1995 | Tilley et al. |
| 5,433,058 A | 7/1995 | Peterson |
| 5,618,146 A | 4/1997 | Cooper |
| 5,630,689 A | 5/1997 | Willis |
| 5,639,199 A | 6/1997 | Connell, Jr. |
| 5,664,923 A | 9/1997 | Olin |
| 5,676,513 A | 10/1997 | Bingham |
| 5,690,461 A | 11/1997 | Tilley |
| 5,697,758 A | 12/1997 | Tilley |
| 5,730,572 A | 3/1998 | Scheuren |
| 5,758,481 A | 6/1998 | Fry |
| 5,799,466 A | 9/1998 | Underhill |
| 5,813,814 A | 9/1998 | Smart |
| 5,829,233 A | 11/1998 | Stirling |
| 5,842,823 A | 12/1998 | Kohnen et al. |
| 5,882,163 A | 3/1999 | Tilley |
| 5,899,652 A | 5/1999 | Graham |
| 5,906,467 A | 5/1999 | Nitzsche |
| 6,019,562 A | 2/2000 | Cheatham |
| 6,053,685 A | 4/2000 | Tomchak |
| 6,152,536 A | 11/2000 | Krinhop |
| 6,247,885 B1 | 6/2001 | Smart |
| 6,312,205 B1 | 11/2001 | Vandenberg |
| 6,537,008 B1 * | 3/2003 | Haring .................. 414/24.5 |
| 6,840,729 B2 | 1/2005 | Haukaas |
| 7,090,456 B2 | 8/2006 | Ost et al. |
| 7,241,098 B1 | 7/2007 | Wilson |
| 7,322,173 B2 | 1/2008 | Desnoyers |
| 7,419,345 B2 | 9/2008 | Priepke |
| 7,887,275 B2 | 2/2011 | Anderson |
| 8,112,202 B2 | 2/2012 | Fackler et al. |
| 2004/0062626 A1 * | 4/2004 | Delaurier .................. 414/24.5 |
| 2004/0177597 A1 | 9/2004 | Dougherty |
| 2007/0031229 A1 | 2/2007 | Murfitt |
| 2007/0261382 A1 | 11/2007 | Spaniol et al. |
| 2011/0014022 A1 | 1/2011 | Shoemaker et al. |

FOREIGN PATENT DOCUMENTS

| | | |
|---|---|---|
| GB | 1516652 | 7/1978 |
| GB | 2194212 A | 3/1988 |
| WO | 9849885 | 11/1998 |

OTHER PUBLICATIONS

Co-Owned U.S. Appl. No. 13/918,250, filed Jun. 14, 2013, pp. 23.
Co-Owned U.S. Appl. No. 13/918,262, filed Jun. 14, 2013, pp. 25.
Co-Owned U.S. Appl. No. 13/918,286, filed Jun. 14, 2013, pp. 27.
Co-Owned U.S. Appl. No. 13/918,293, filed Jun. 14, 2013, pp. 19.
PAMI, Hesston 5200 Round-Up Multiple Bale Mover, May 1977, pp. 5.
PAMI, New Holland Model 85 Bale Handler, Jun. 1977, pp. 5.
BMC Partnership, Infield Loader, retrieved May 24, 2012, pp. 1.

* cited by examiner

APPARATUS AND METHODS FOR GATHERING BALES

CROSS-REFERENCE TO RELATED APPLICATION

The present application claims the benefit of U.S. Provisional Application No. 61/665,752, filed Jun. 28, 2012, which is incorporated herein by reference in its entirety.

FIELD OF THE DISCLOSURE

The field of this disclosure relates to apparatus and methods for gathering bales and, in particular, round bales such as hay or corn stover bales.

BACKGROUND

Crop forages such as hay (e.g., alfalfa and/or grass hay) are periodically cut in the field, dried and compacted into bales for transport and storage of the forage material. Recent evolutions in row crop production and in technology for processing these materials have led to changes in the scale and economics of harvest and to increasing potential for harvest of crop residues like corn stover. Corn stover is also baled in the field and used as livestock feed, bedding or production of biofuels. In addition, harvest technology for cotton has been developed, that includes the step of baling the cotton in the field. Due to these relatively recent changes, the scale at which this type of harvest process is conducted in some instances is different than the traditional process. The density of the bales, in terms of the number of bales per acre, is higher in some instances, the labor availability is less in some instances and the criticality of timing is higher in some instances.

Materials may be baled into relatively large round (round in cross-section) bales which may be tied by twine, netting or plastic wrap depending on the type of material, the type of storage and the intended use of the material. The bales are typically left in the field, near the location where the bale was formed, to minimize labor and time required for the harvest process including the baling operation.

A continuing need exists for an apparatus for gathering and transporting round bales in the field after baling, one that allows the bales to be gathered relatively quickly and reliably and in a way to minimize demands on the operator, and that consistently positions the bales adjacent one another to minimize the area required for storage. A need also exists for methods for gathering bales that use such apparatus.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to an apparatus for gathering round bales resting on a surface. The apparatus includes a bed for holding a plurality of bales and a loading assembly for lifting a bale and conveying it to the bed. The bed has a first end, second end and a lengthwise axis that extends through the first and second ends of the bed. The loading assembly includes a first arm and second arm. The first arm includes a first conveyor belt having a first bale-engaging face with a lengthwise axis, wherein (1) the lengthwise axis of the first bale-engaging face is substantially parallel to the lengthwise axis of the bed or (2) the lengthwise axis of the first bale-engaging face and the lengthwise axis of the bed form an angle $\beta_1$, $\beta_1$ being less than about 30°. The second arm includes a second conveyor belt having a second bale-engaging face with a lengthwise axis, wherein (1) the lengthwise axis of the second bale-engaging face is substantially parallel to the lengthwise axis of the bed or (2) the lengthwise axis of the second bale-engaging face and the lengthwise axis of the bed form an angle $\beta_2$, $\beta_2$ being less than about 30°.

Another aspect of the present disclosure is directed to a method for gathering round bales resting on a surface by use of an apparatus. The apparatus includes a bed for holding a plurality of bales and a loading assembly for lifting a bale and conveying it to the bed. The bed has a first end, second end and a lengthwise axis that extends through the first and second ends of the bed. The loading assembly has a first arm including a first conveyor belt having a first bale-engaging face with a lengthwise axis and a second arm including a second conveyor belt having a second bale-engaging face with a lengthwise axis. The first bale-engaging face is contacted with a bale. The lengthwise axis of the first bale-engaging face (1) is substantially parallel to the lengthwise axis of the bed when the first bale-engaging face contacts the bale or (2) forms an angle $\beta_1$ with the lengthwise axis of the bed when the first bale-engaging face contacts the bale, $\beta_1$ being less than about 30°. The second bale-engaging face is contacted with a bale. The lengthwise axis of the second bale-engaging face (1) is substantially parallel to the lengthwise axis of the bed when the second bale-engaging face contacts the bale or (2) forms an angle $\beta_2$ with the lengthwise axis of the bed when the second bale-engaging face contacts the bale, $\beta_2$ being less than about 30°. The first conveyor belt and second conveyor belt move to convey the bale toward the bed.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
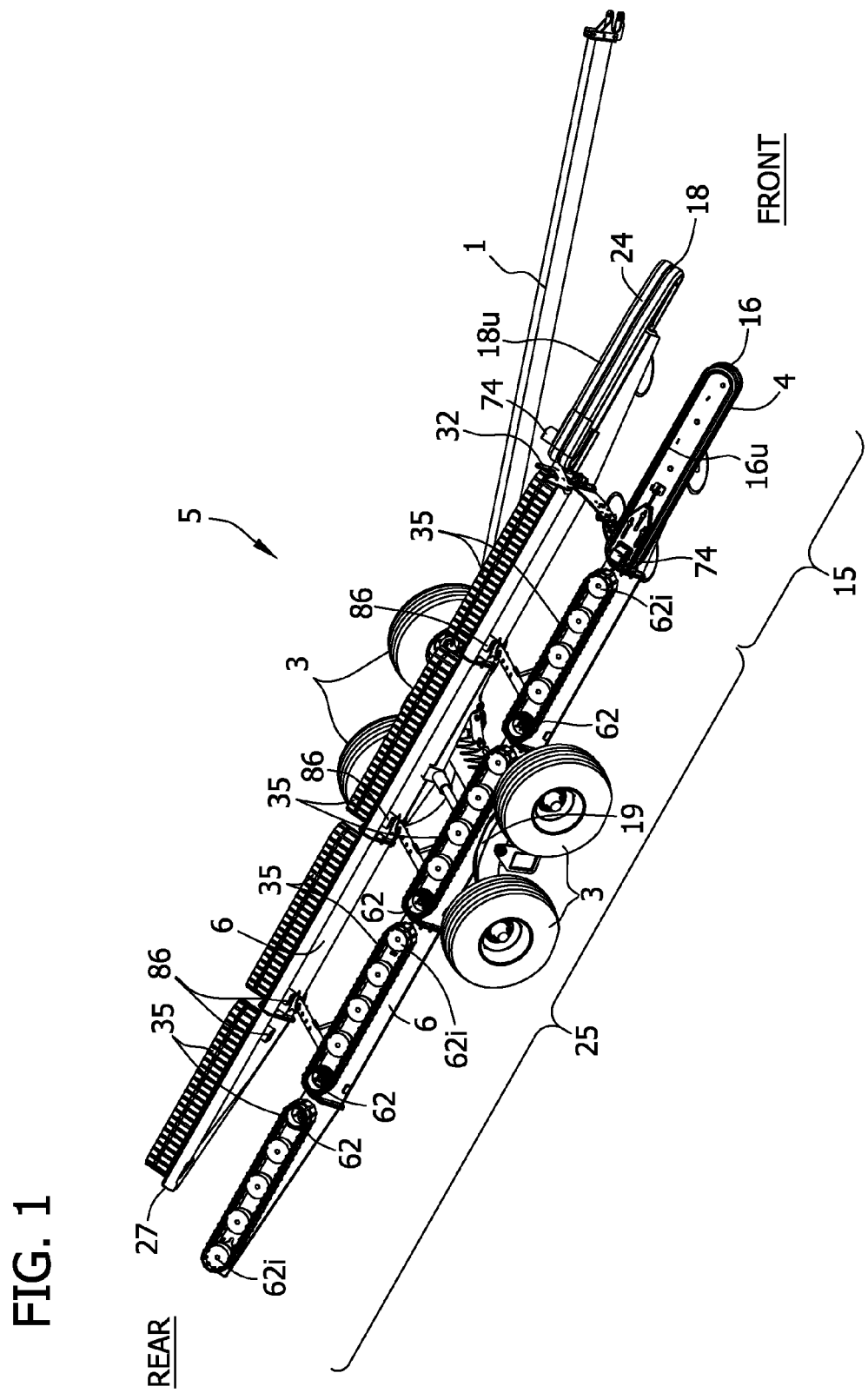
FIG. 1 is a perspective view of an apparatus for gathering bales.

An embodiment of an apparatus for gathering round bales is generally referred to as 5 in FIG. 1. The apparatus 5 includes a bed 25 for holding one or more bales and a loading assembly 15 for lifting a bale of the ground and conveying it to the bed. The apparatus 5 includes a tongue 1 for pulling the apparatus by use for example, a tractor or other pulling vehicle. In some embodiments (not shown) the apparatus 5 includes its own propulsion mechanism rather than being pulled by a pulling vehicle.

Figure 9:
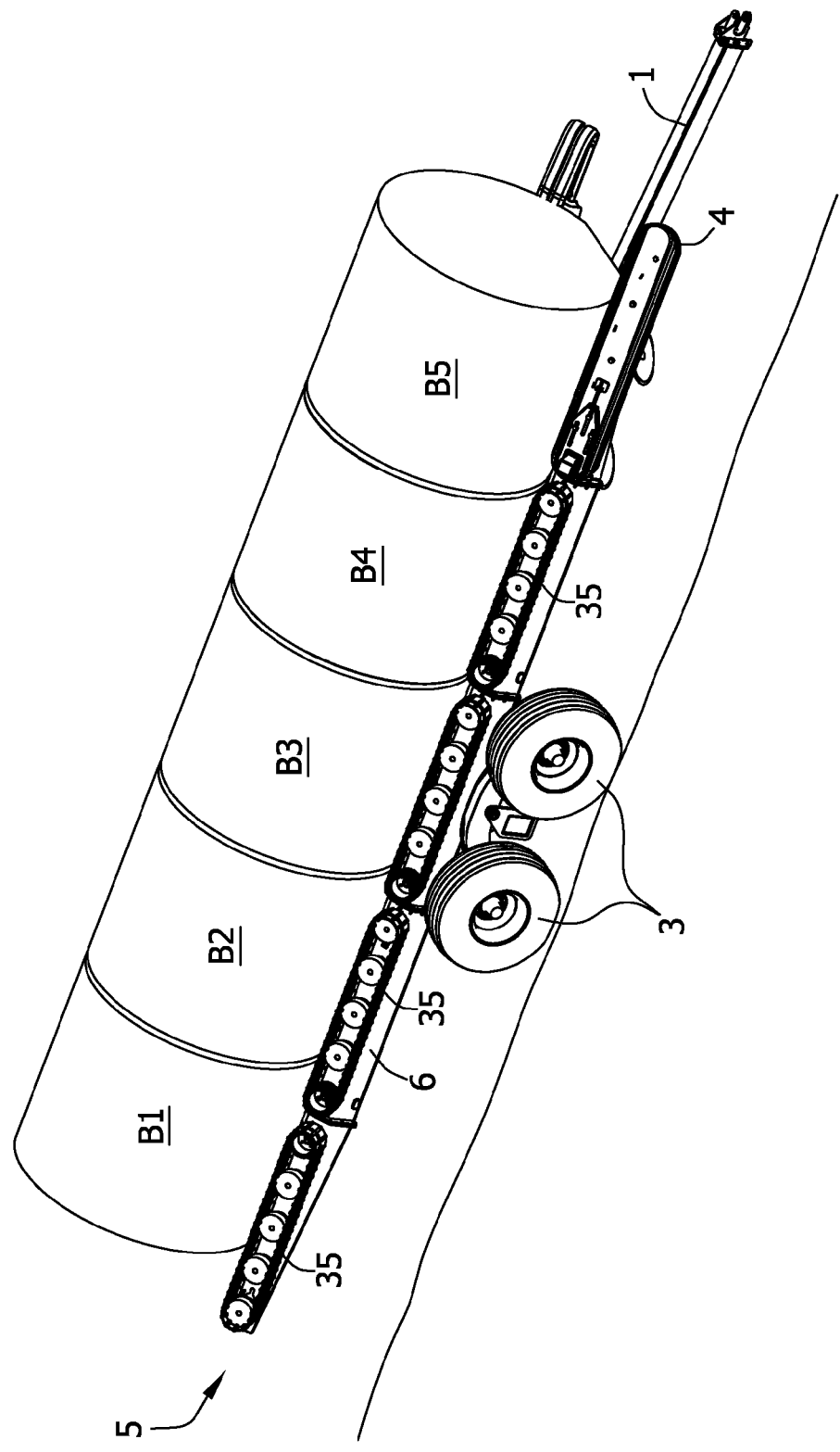
FIG. 9 is a perspective view of the apparatus after being loaded with bales.
Figure 10:
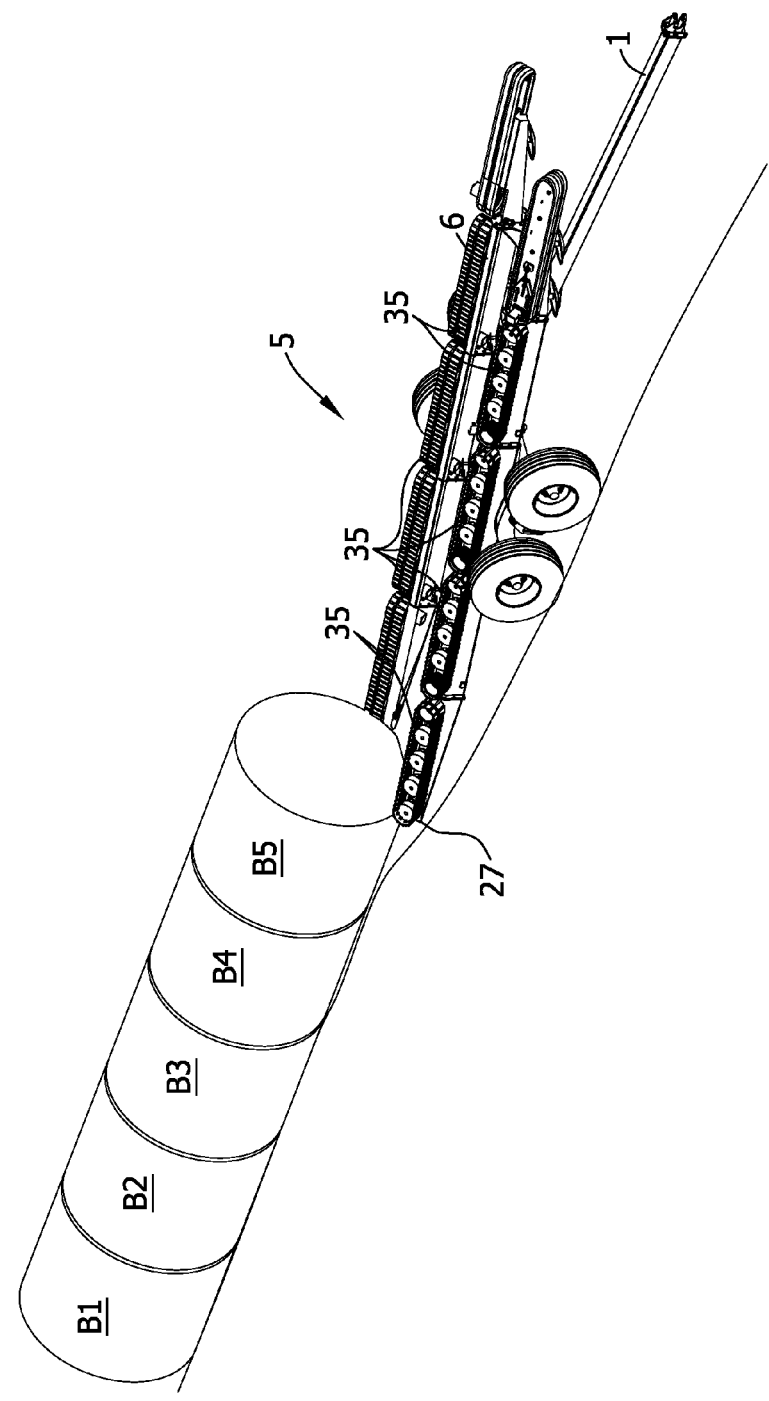
FIG. 10 is a perspective view of the apparatus during unloading of bales.
Figure 11:
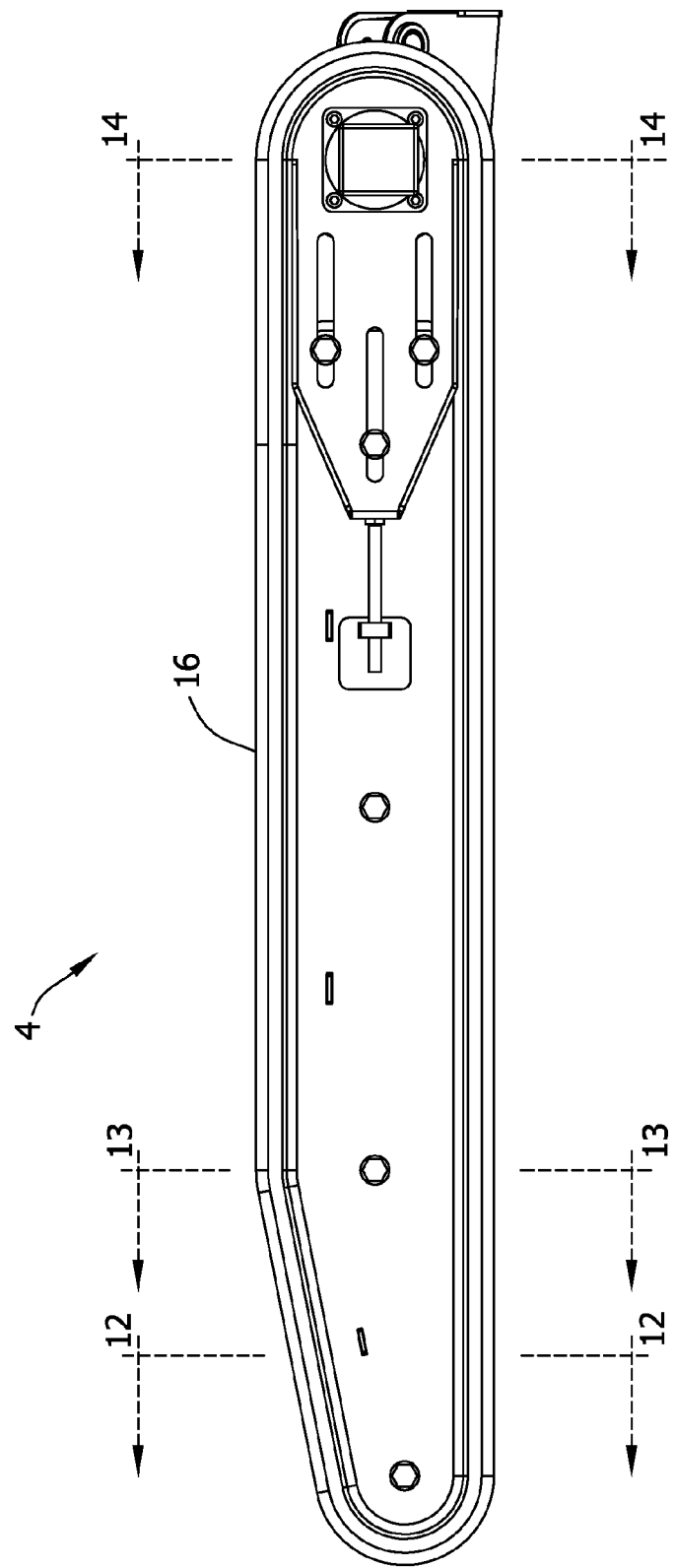
FIG. 11 is a side view of one side of the loading device of the apparatus.

The apparatus 5 includes wheels 3. The wheels 3 on each side of the apparatus 5 are attached to a tandem axle 19 by use of hub and spindle assemblies (not shown). The tandem axles 19 are connected by a frame which is pivotally connected to the bed chassis 6. This arrangement allows the bed 25 to be tilted between various positions. The bed may be tilted to a forward position for loading the bales (FIG. 7) or unloading to the front, to a middle position used after bales have been loaded for transportation of the loaded bales (FIG. 9) or to a rearward tilted position for unloading and re-loading of bales to the rear (FIG. 10). The apparatus 5 may be tilted hydraulically through manual or automatic control by use of a hydraulic cylinder 17 (FIG. 2) or by any other method available to those of skill in the art. Tracks (not shown) may be used as an alternative to the wheels 3.

Figure 12:
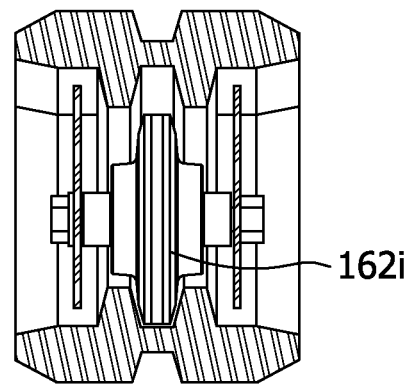
FIG. 12 is a cross-sectional view through the loading device as shown in FIG. 11.
Figure 13:
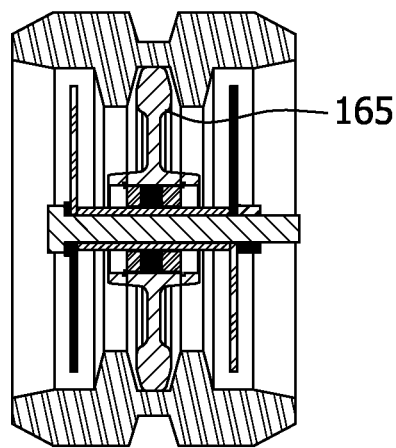
FIG. 13 is a cross-sectional view through the loading device as shown in FIG. 11.

The loading assembly 15 includes two arms 4, 24 that are the first portion of the apparatus 5 to contact the bale during loading. Each arm 4, 24 includes an endless conveyor belt 16, 18. Referring now to FIGS. 8-11 in which one arm 4 is shown in detail, the endless conveyor belt 16 moves along a path between a front idler roller 162i (FIG. 12) that rotates freely and a driven rear roller 162 (FIG. 14) connected to a rotary power device such as a hydraulic motor described below. The arm 4 includes support rollers 165 (FIG. 13) positioned between the front idler roller and the drive roller.

Figure 7:
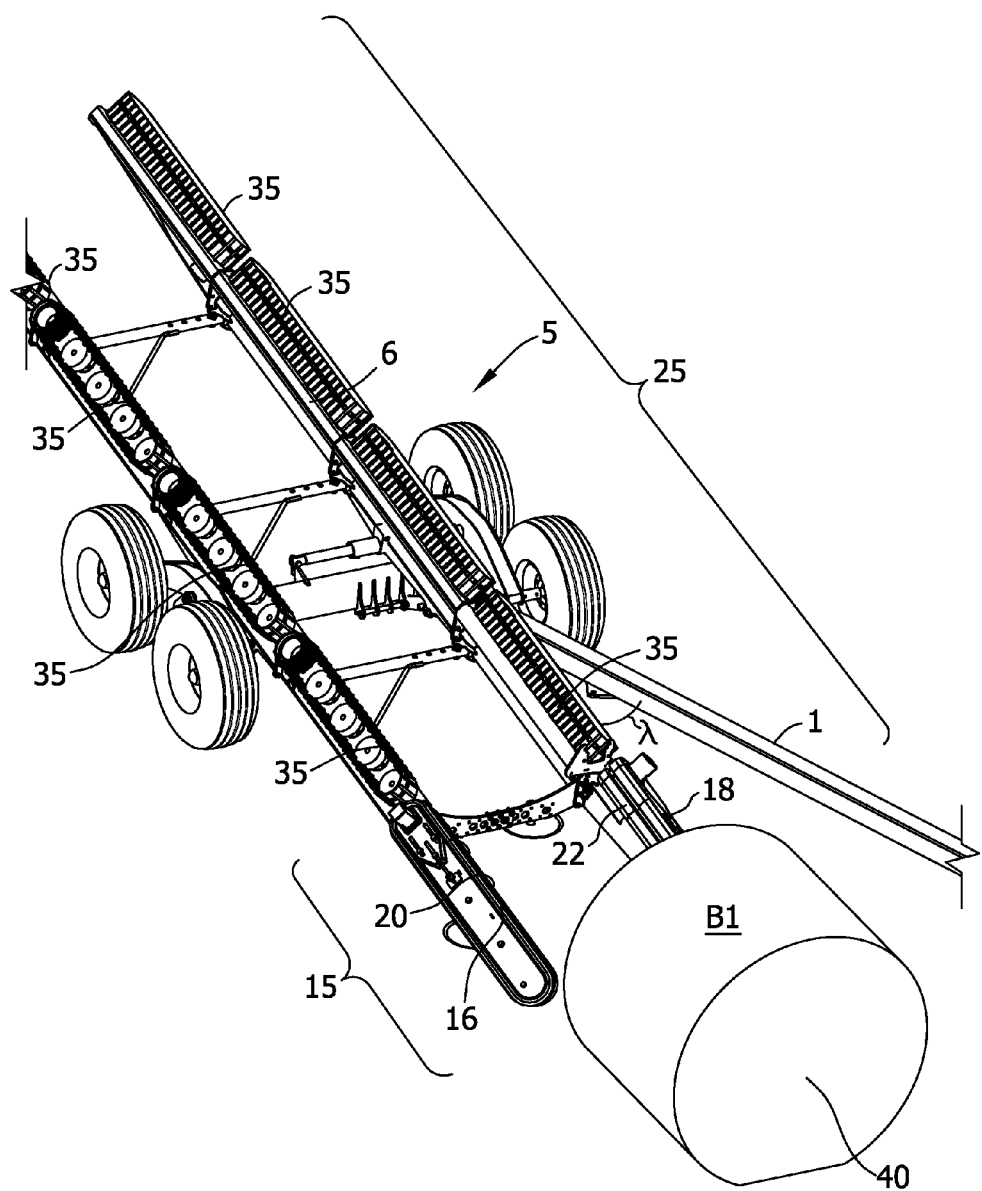
FIG. 7 is a perspective view of the apparatus prior to loading a round bale.
Figure 14:
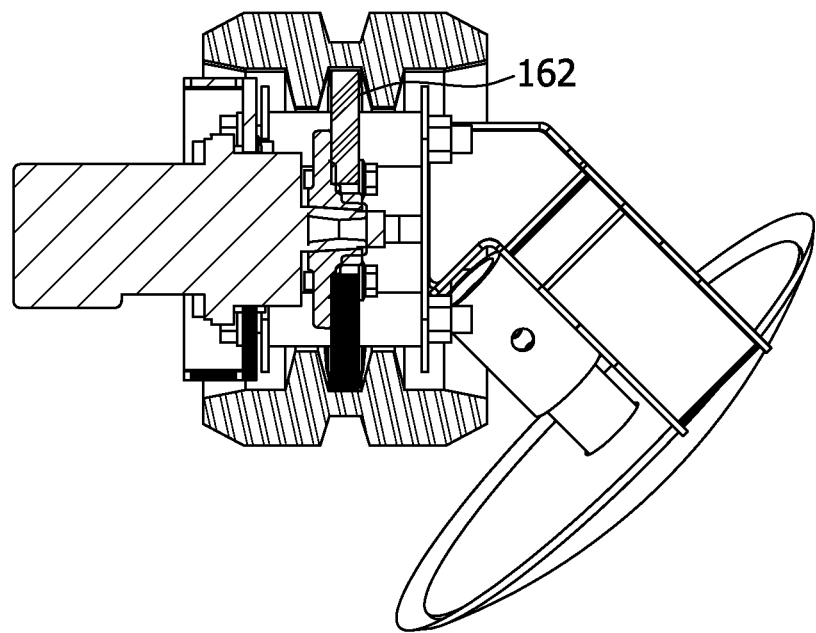
FIG. 14 is a cross-sectional view through the loading device as shown in FIG. 11.
Figure 15:
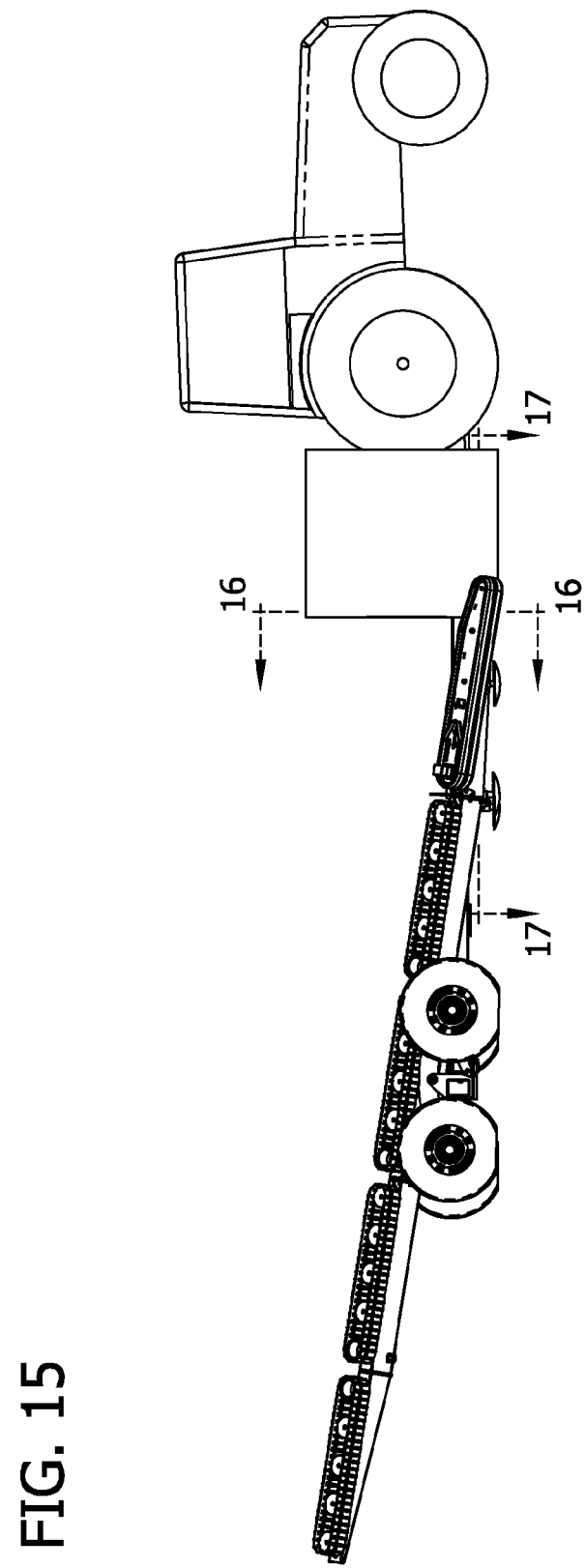
FIG. 15 is a side view of the apparatus and a pulling vehicle as the loading assembly lifts a bale.
Figure 16:
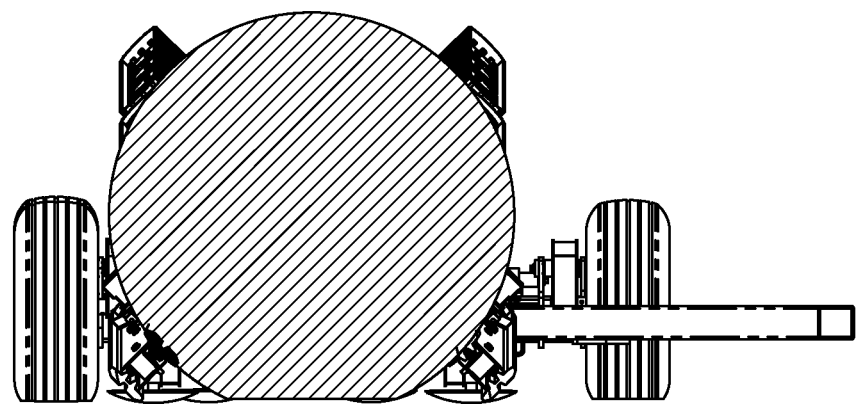
FIG. 16 is a front view of the apparatus and a pulling vehicle as the loading assembly lifts a bale.
Figure 17:
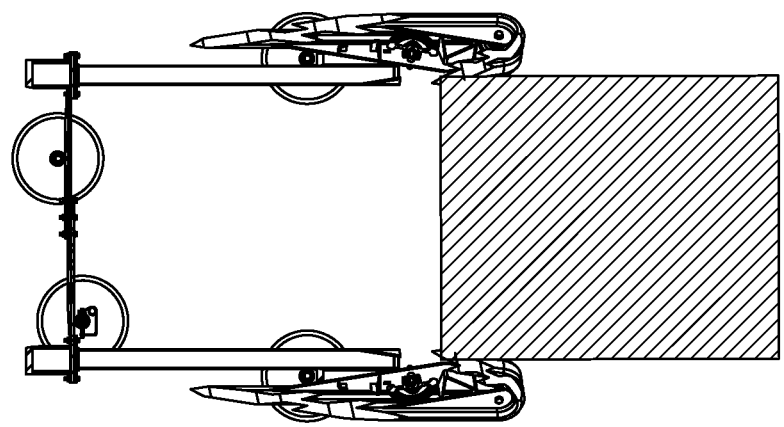
FIG. 17 is a top view of the apparatus as the loading assembly lifts a bale.

Each belt 16, 18 includes upper portions 16u, 18u (FIG. 1) that are capable of carrying the weight of a bale. The effective length of these conveyors is approximately the length of this upper surface, or the distance between the front idler roller 162i (FIG. 12) and the rear drive roller 162 (FIG. 14). The movement of the belt, around the front idler roller 162i and backward along the upper portion of the belt path, has been found to be effective to lift a bale off the ground and for simultaneously causing the bale to move toward the bed 25. This lifting and transporting action occurs after the two conveyor belts contact the bale B1 (FIG. 7).

The portion of the belt 16, 18 (FIG. 3) that initially contacts the bale may be referred to herein as the "bale-engaging face" 20, 22. Each bale engaging face 20, 22 of the arms 4, 24 of the apparatus 5 includes a generally planar surface with an effective length equal to the distance between the front idler roller and rear drive roller, and a width equal to the width of the conveyor belt. The axis of rotation of the idler roller and drive roller and any intermediate support rollers are generally parallel. The axes of rotation of these rollers determines the vertical axes of the bale-engaging faces 20, 22. The vertical axis $Y_1$ of the bale-engaging face 20 forms an angle $\theta_1$ with the surface on which the bale rests, the ground (i.e., is not parallel or perpendicular to the ground surface). The vertical axis $Y_2$ of the bale-engaging face (not shown) of the second arm similarly forms an angle $\theta_2$ with the surface on which the bale rests. In this regard, it should be noted that the surface on which the bale rests may be curved. In such embodiments, $\theta$ should be determined with reference to a flat horizontal surface.

Angles $\theta_1$ and $\theta_2$ may be selected such that the bale-engaging faces 20, 22 match the contour of the bales being loaded. For example, if it is desired to contact the bale at its 4:30 and 7:30 positions, the vertical axis $Y_1$ and $Y_2$ may form an angle of about 45° with the ground-surface. If it is desired to contact the bale at its 5:00 and 7:00 positions, the vertical axis $Y_1$ and $Y_2$ may form an angle of about 30° with the ground-surface. It should be noted that, for a set spacing between arms, the angular position of the bale at which the bale-engaging faces 20, 22 contact the bale may vary with varying bale diameters. In some embodiments of the present disclosure, the spacing between arms is adjustable to account for changes in bale and/or baler sizes.

In various embodiments, both $\theta_1$ and $\theta_2$ may be between about 10° and about 80° or from about 20° to about 70°, from about 30° to about 60°, from about 40° to about 50° or at about 45°.

Figure 4:
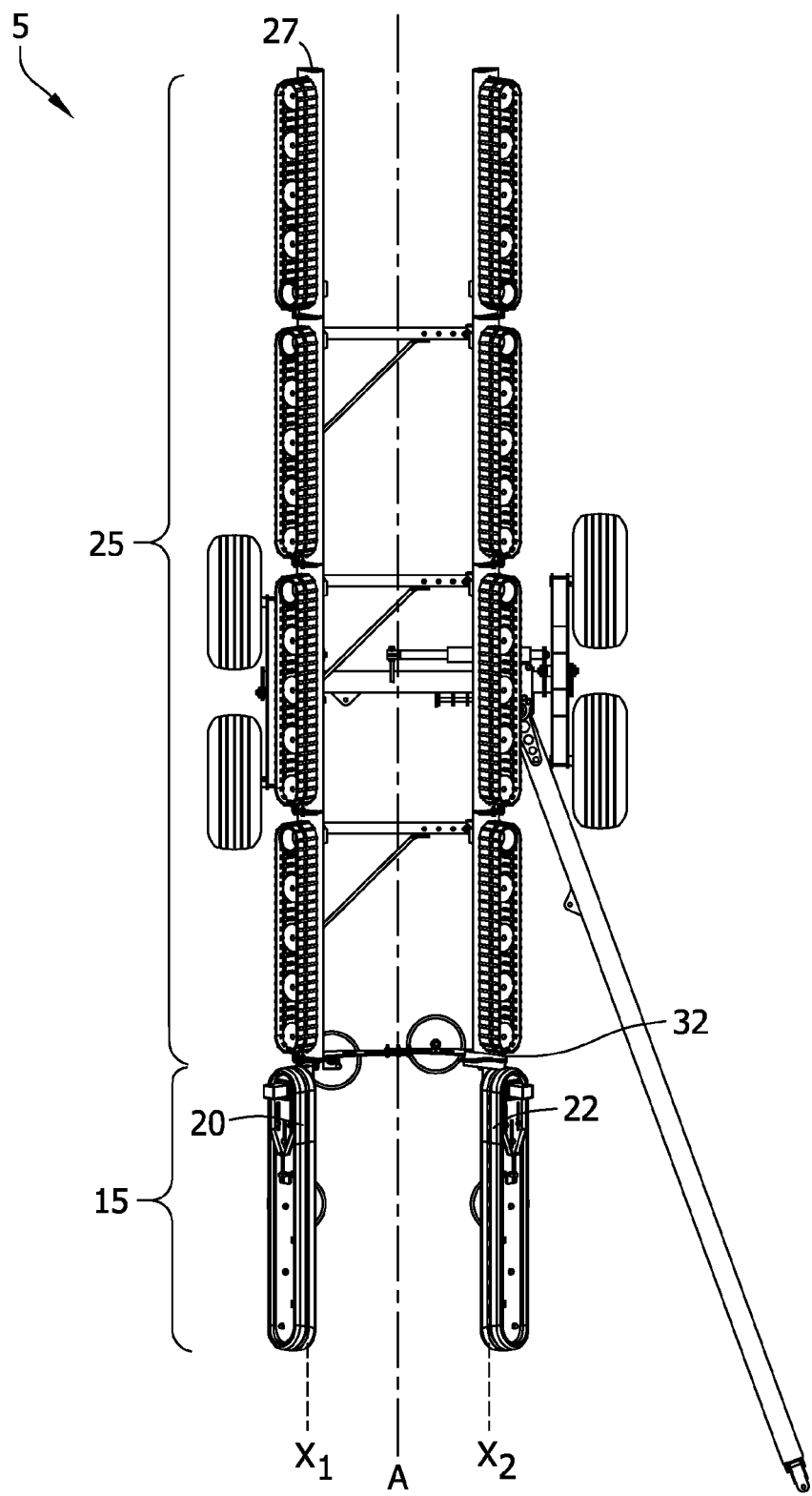
FIG. 4 is a top view of the apparatus.

Referring now to FIG. 4, the bed 25 has a first end 27 and a second end 32 and has a lengthwise axis A that extends through the first and second ends of the bed. In some embodiments and as shown in FIG. 4, the lengthwise axis $X_1$ of the first bale-engaging face 20 and the lengthwise axis $X_2$ of the second bale-engaging face 22 are substantially parallel to the lengthwise axis A of the bed 25.

Figure 5:
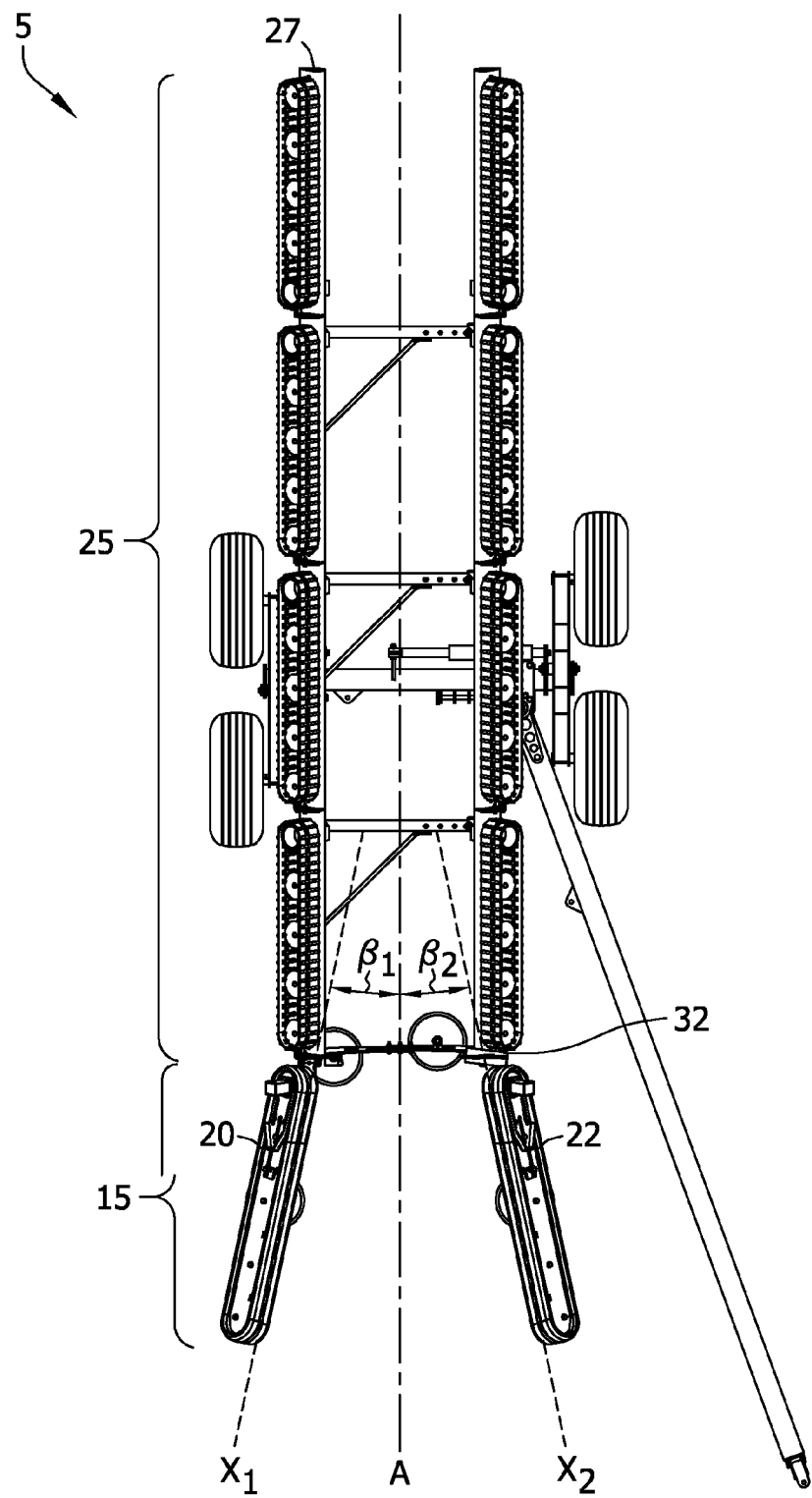
FIG. 5 is a top view of the apparatus showing alternative positions for the arms.

As shown in FIG. 5, rather than being parallel, the lengthwise axes $X_1$, $X_2$ of the bale-engaging faces 20, 22 may form angles $\beta_1$, $\beta_2$ with the lengthwise axis A of the bed 25. In some embodiments, both $\beta_1$ and $\beta_2$ are less than about 30° or less than about 20°, less than about 10° or less than about 5° (e.g., from 0° to about 30° or from about 5° to about) 30°.

Figure 6:
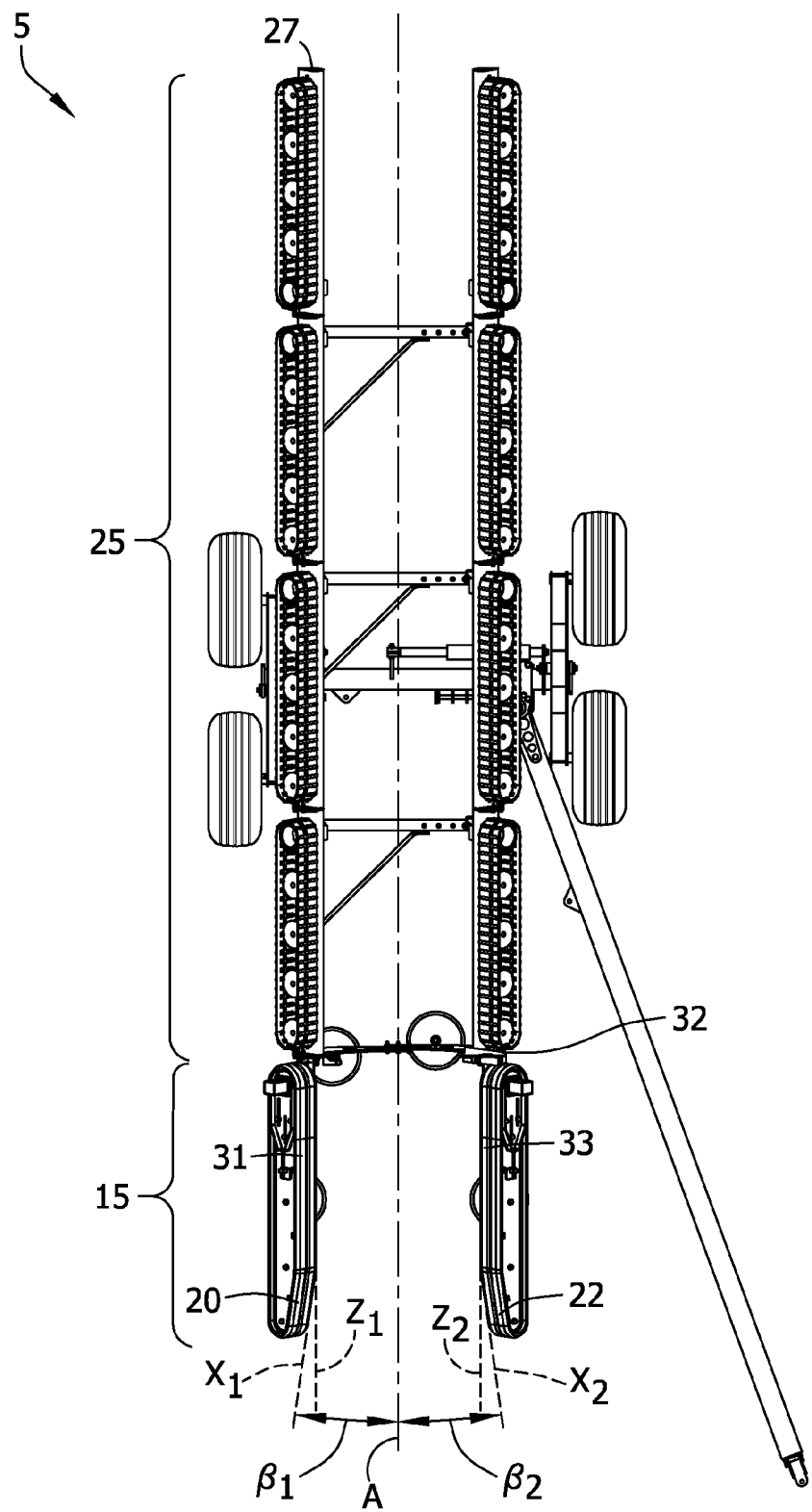
FIG. 6 is a top view of the apparatus showing an alternative configuration of the arms.

In some embodiments and as shown in FIG. 6, the first and second conveyor belts 16, 18 may include several angular portions. The leading angular portions of the belts 16, 18 form the bale-engaging faces 20, 22. The bale-engaging faces have lengthwise axis $X_1$, $X_2$ which form angles $\beta_1$, $\beta_2$ with the lengthwise axis A, With $\beta_1$ and $\beta_2$ being less than about 30° or less than about 20°, less than about 10° or less than about 5° (e.g., from 0° to about 30° or from about 5° to about 30°). As shown in FIG. 6, the bale-engaging faces 20, 22 may transition to second portions 31, 33 of the conveyor belts that have lengthwise axes $Z_1$, $Z_2$ that are parallel to the lengthwise axis A of the bed 25.

Referring again to FIG. 1, the bed 25 includes a number of bed conveyors 35, each including of an endless belt routed around a front or rear idler roller and a rear or front powered roller that may be rotated to cause the belt to move which results in moving bales away from the loading assembly and toward the end 27 of the bed. Each conveyor 35 may have a length, the distance between the idler roller and the drive roller that is about the length of one bale. Typical bale lengths for forage products are between about forty and sixty inches, but the apparatus should not be limited by bale size; the bed could be constructed to function with bales that are in excess of sixty inches in length (e.g., cotton bales which are in the range of 100 inches in length).

Alternatively, the bed 25 may have one bed conveyor (not shown) on each side that extends from the first end 32 to the second end 27 rather than a series of bed conveyors on each side. In some embodiments, the bed 25 has a single conveyor belt (not shown) that forms a floor of the bed upon which the bales rest for moving bales toward the second end 27.

The conveyor belts 16, 18 of the first and second arms 4, 24 of the loading assembly may be driven by hydraulics, by a power-take-off system or by an electrical drive. Similarly, the bed conveyor belts 35 may be driven by hydraulics, a power-take-off system or an electric drive. The position of the loading assembly 15 and bed 25 relative to the pull vehicle (i.e., whether the apparatus is pulled directly behind the pull vehicle or at an offset position such as when bales are being gathered from the field) may be adjusted by manipulating the angle between the tongue 1 and the chassis 6 (FIG. 7) by use of hydraulics or by any other method suitable to those of skill in the art.

The bed conveyors 35 could be constructed from the same basic components used in the loading assembly conveyors, with an endless conveyor belt, an idler roller, a drive roller and supports. The embodiments illustrated herein show an alternative construction for the bed conveyors 35, each including an endless conveyor belt of a slightly different construction than the belts 16 and 18, routed around a drive pulley 62 and an idler pulley 62i. In some cases the drive pulley 62 is positioned at the front, and in some cases at the rear.

The surface characteristics of the conveyors 16, 18 may affect the frictional engagement between the conveyor belt and the bale. The conveyor belts 16, 18 may include a surface that will adequately engage the bale to enhance the capability for the loading assembly to reliably lift the bales while also minimizing potential for damage to the bale and any bale wrapping.

It should be noted that any suitable type of conveyer belts or conveyor systems may be included in the apparatus. For instance, a conveyor belt composed of a carcass of nylon or fiberglass fibers covered by a wide variety of materials including rubber, PVC, thermoplastic polymer or the equivalent may be used. Chain conveyor systems may also be used without departing from the scope of the present disclosure. In this regard, "conveyor belt" as used herein includes any arrangement in which a belt, chain, track or the like is moved around a series of pulleys to cause movement of the belt, chain or track.

Figure 3:
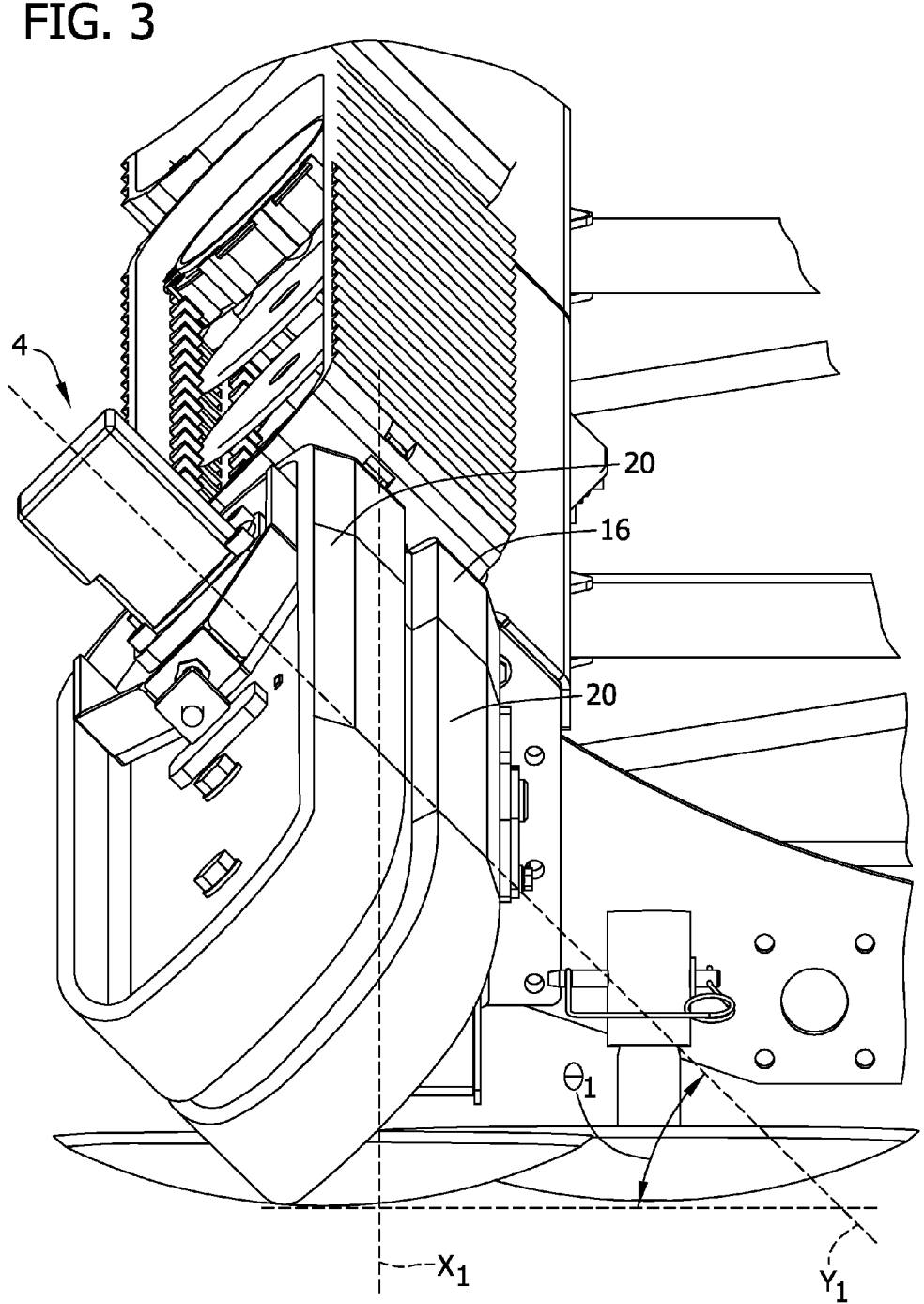
FIG. 3 is a front view of a portion of the apparatus.

In operation, the apparatus 5 is pulled by the pull vehicle (not shown) toward a bale as shown in FIG. 3. The vehicle may provide the power for running the various conveyors and positioning systems (e.g., by use of hydraulics) or the apparatus 5 may include its own dedicated power system (e.g., hydraulic system). The apparatus described herein uses a hydraulic system, but this disclosure should not be limited to a hydraulic system as the principles would apply to other power transfer technologies such as an electrical system.

Generally, the apparatus 5 is suitable for picking up cylindrical bales commonly referred to as "round" bales. Round bales are used for harvesting any material capable of being formed into a cylindrical bale such as traditional hay crops (e.g., alfalfa or grass), corn stover or other crop residues, cotton, or woody products like small diameter trees. The round bales may have a variety of sizes typically ranging from forty to one hundred inches in diameter and forty to one hundred inches in length. The apparatus 5 shown in FIGS. 1-17 is configured for loading up to 5 bales. The apparatus 5 may be modified to carry more or less bales without departing from the scope of the present disclosure.

As shown in FIG. 7, the bale B1 should be oriented such that the ends 40 of the cylindrical bale are perpendicular to the apparatus 5 as the apparatus 5 approaches the bale B1.

The chassis 6 and tongue 1 are caused to be at an angle $\lambda$ (FIG. 7) relative to one another such that the loading assembly 15 and bed 25 travel outside of the path of the pull vehicle (not shown) to allow the pull vehicle to travel to the outside of bales targeted for loading.

The first and second conveyor belts 16, 18 are caused to move by rotating the drive rollers while the apparatus 5 travels toward the bale B1. As the apparatus 5 approaches the bale B, the conveyor belts 16, 18 of the arms 4, 24 contact the bale causing the bale to be lifted and simultaneously moved toward the bed 25. The bale B1 may be loaded onto the loading assembly 15 without stopping the apparatus 5 such that the apparatus 5 and the vehicle which pulls the apparatus may continually move forward during bale pick-up.

Figure 8:
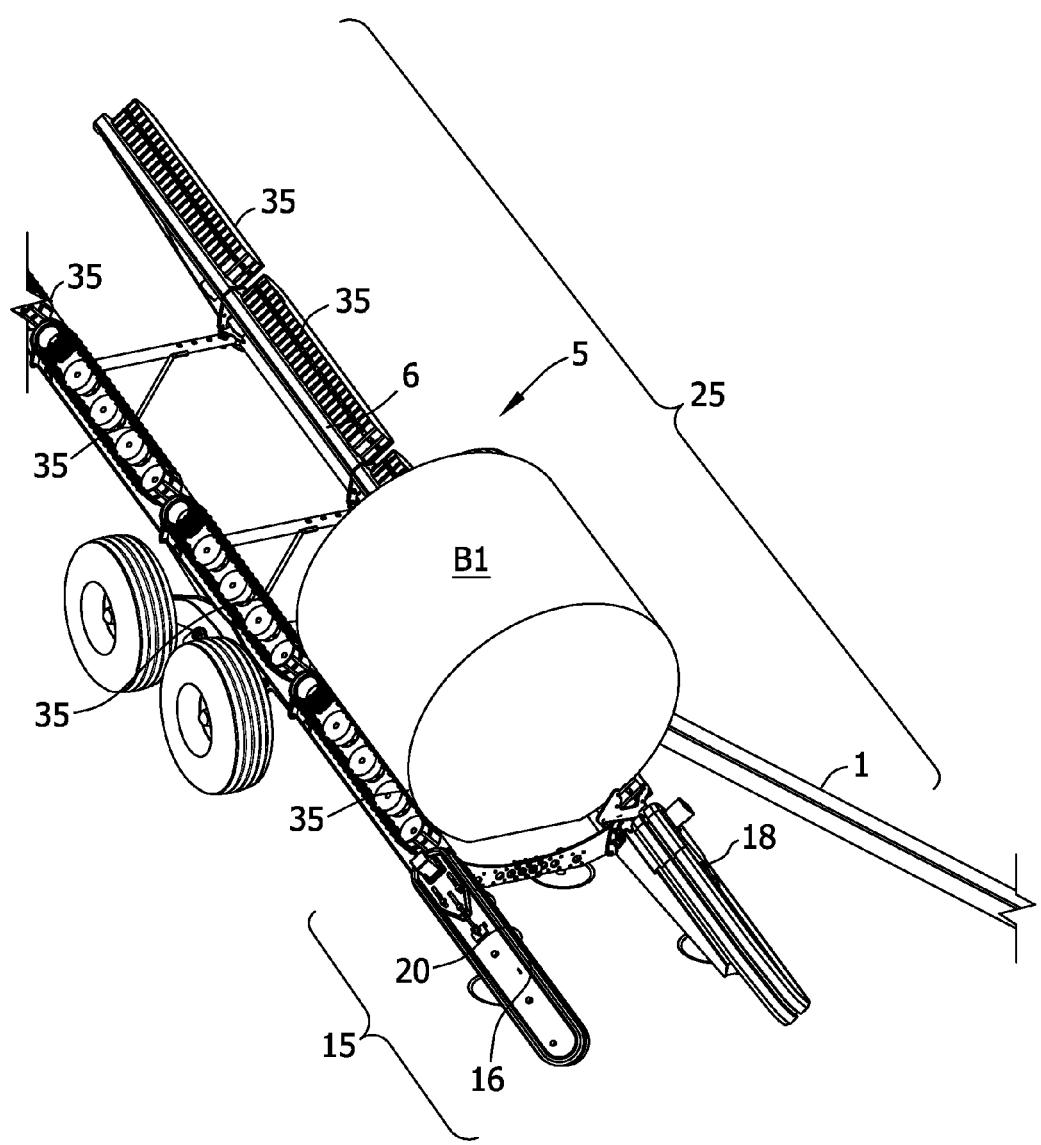
FIG. 8 is a perspective view of the apparatus after the round bale has been loaded onto the bed.

Once the bale is loaded on the loading assembly 15, belt conveyors 35 (e.g., the set of conveyors nearest the loading assembly) move to transfer the bale B1 from the loading assembly 15 to the position on the bed illustrated in FIG. 8. Once loaded onto the bed 25, the bed conveyors 35 are stopped to position the first bale adjacent the end of the loading assembly.

Once the first bale B is loaded, the apparatus 5 is directed to a second bale. The loading assembly 15 lifts the second bale and carries the second bale toward the bed 25 until it contacts or nears the first bale. Upon contacting or nearing the first bale, one or more sets of bed conveyors 35 are caused to rotate and the first and second bales travel partially down the bed 25 toward the second end 27.

Bales may continue to be loaded onto the apparatus 5 until the apparatus becomes fully loaded. Once fully loaded, the apparatus 5 may be adjusted to promote ease of travel to the unloading site. As shown in FIG. 9, the chassis 6 of the apparatus 5 may be leveled by use of hydraulic cylinder 17 (FIG. 2) and the relative position between the tongue 1 and the bed 15 may be adjusted (e.g., the tongue may be adjusted to be more parallel to the bed).

Figure 2:
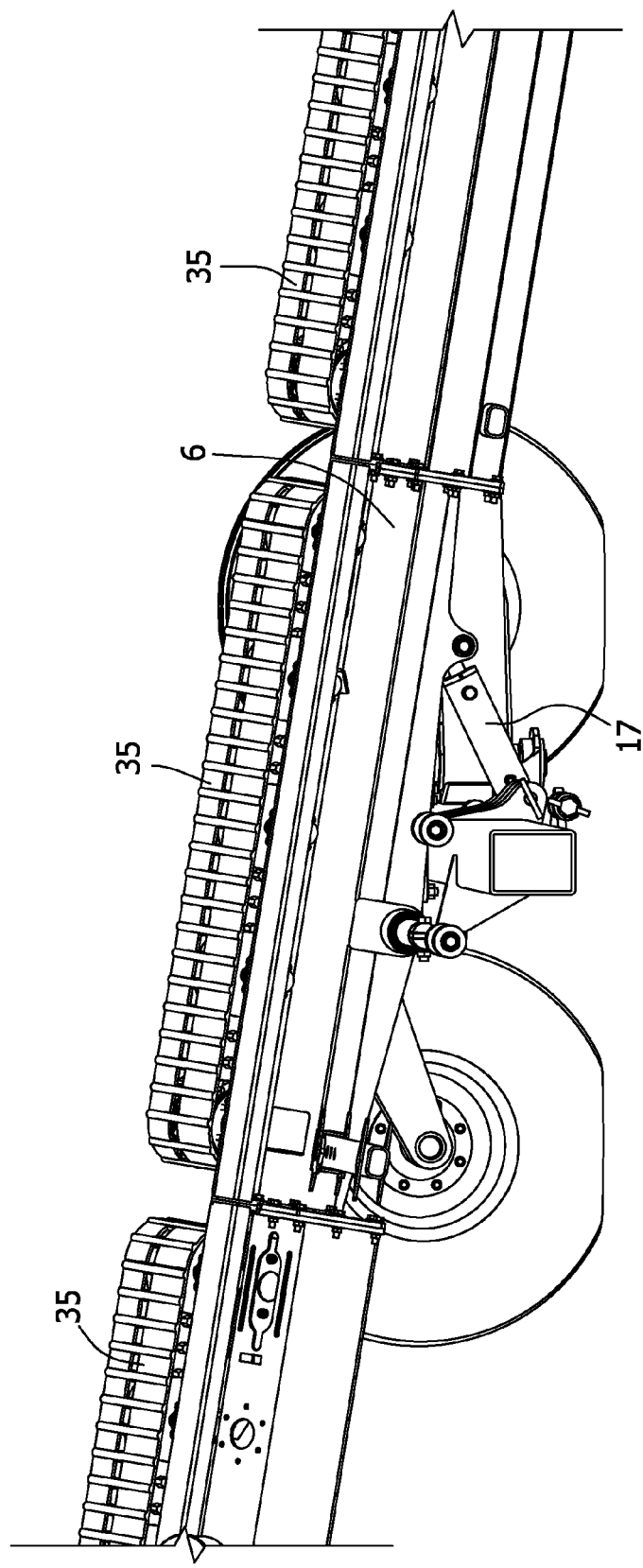
FIG. 2 is a perspective view of a portion of the apparatus showing a hydraulic cylinder for tilting the chassis of the apparatus.

As shown in FIG. 10, once the apparatus 5 is pulled to the desired unloading site for the bales, the chassis 6 is tilted by use of the hydraulic cylinder 17 (FIG. 2). The bed conveyors 35 are operated and the apparatus 5 is caused to move forward while the bales are unloaded. In some embodiments, the chassis 6 is tilted as when bales are loaded onto the bed (FIG. 7) and the apparatus is caused to move backward with rotation of the bed conveyors 35 such that bales are unloaded to the front.

Compared to conventional apparatus for gathering bales, the apparatus 5 described above has several advantages. In some embodiments, the components of the apparatus that initially contact a bale are moving toward the rear of the device thereby minimizing damage to the bale and any bale-wrapping (i.e., the apparatus does not contain stationary parts which initially contact the bale). By arranging the arms such that the lengthwise axis of the bale-engaging surfaces 20, 22 of each loading arm 4, 24 are parallel to (FIG. 4) or form an angle of less than 30° with the lengthwise axis of the bed (FIGS. 5 and 6), the conveyor belts 16, 18 may be prevented from being bound by the bale as the bale proceeds up the arms 4, 24 and toward the bed 25. Further, by arranging the arms 4, 24 such that the vertical axes $Y_1$, $Y_2$ of bale-engaging faces form an angle with the surface on which the bale rests, the bale-engaging faces 20, 22 may complement the contour of the bale at the portion of the bale which contacts the bale-engaging faces 20, 22 which eases the lifting the bale and helps facilitate transfer of bale from the ground to the loading assembly 15. In addition, by using a loading assembly 15 separate from the bed 25, the loading assembly conveyor belts 16, 18 may rotate independent of the conveyor belts 35 of the bed 25, thereby minimizing the amount of rotation of the bed conveyor belts 35 which prevents loaded bale(s) from being damaged.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An apparatus for gathering round bales resting on a surface, the apparatus comprising:
   a bed for holding a plurality of bales, the bed having a first end, second end and a lengthwise axis that extends through the first and second ends of the bed; and
   a loading assembly for grasping and lifting a bale and conveying it to the bed, the loading assembly comprising:
   a first arm comprising a first conveyor belt having:
      a leading angular portion that forms a first bale-engaging face with a lengthwise axis and a vertical axis, the lengthwise axis of the first bale-engaging face and the lengthwise axis of the bed forming an angle $\beta_1$, $\beta_1$ being less than about 30°, the vertical axis of the first bale-engaging face not being parallel or perpendicular to the surface on which the bale rests; and
      a second portion having a lengthwise axis and a vertical axis, the lengthwise axis of the second portion being angled with respect to the lengthwise axis of the leading angular portion, the vertical axis of the second portion not being parallel or perpendicular to the surface on which the bales rest,
      wherein in a loading position the first arm extends downward from the bed and toward the surface on which the bales rest; and
   a second arm comprising a second conveyor belt having:
      a leading angular portion that forms a second bale-engaging face with a lengthwise axis and a vertical axis, the lengthwise axis of the second bale-engaging face and the lengthwise axis of the bed forming an angle $\beta_2$, $\beta_2$ being less than about 30°, the vertical axis of the second bale-engaging face not being parallel or perpendicular to the surface on which the bale rests; and
      a second portion having a lengthwise axis and a vertical axis, the lengthwise axis of the second portion being angled with respect to the lengthwise axis of the leading angular portion, the vertical axis of the second portion not being parallel or perpendicular to the surface on which the bale rests,
      wherein in a loading position the second arm extends downward from the bed and toward the surface on which the bales rest.

2. The apparatus as set forth in claim 1 wherein:
   the vertical axis of the first bale-engaging face forms an angle $\theta_1$ with the surface on which the bales rest, $\theta_1$ being between about 10° and about 80°; and
   the vertical axis of the second bale-engaging face forms an angle $\theta_2$ with the surface on which the bales rest, $\theta_2$ being between about 10° and about 80°.

3. The apparatus as set forth in claim 2 wherein both $\theta_1$ and $\theta_2$ are between about 30° and about 60°.

4. The apparatus as set forth in claim 2 wherein both $\theta_1$ and $\theta_2$ are between about 40° and about 50°.

5. The apparatus as set forth in claim 1 wherein $\beta_1$ is less than about 10° and $\beta_2$ is less than about 10°.

6. The apparatus as set forth in claim 1 wherein $\beta_1$ is less than about 5° and $\beta_2$ is less than about 5°.

7. The apparatus as set forth in claim 1 comprising a bed conveyor for moving bales on the bed.

8. The apparatus as set forth in claim 1 comprising a first bed conveyor and a second bed conveyor for moving bales on the bed.

9. The apparatus as set forth in claim 1 wherein the bed comprises a chassis and a hydraulic cylinder attached to the chassis for tilting the bed.

10. The apparatus as set forth in claim 1 comprising:
    a chassis;
    a tongue attached to the chassis for attachment to a pulling vehicle; and
    a hydraulic cylinder attached to the chassis and tongue for moving the chassis relative to the tongue.

11. The apparatus as set forth in claim 1 wherein:
    the lengthwise axis of the second portion of the first arm is parallel to the lengthwise axis of the bed; and
    the lengthwise axis of the second portion of the second arm is parallel to the lengthwise axis of the bed.

12. A method for gathering round bales resting on a surface by use of an apparatus, the bales being cylindrical and having two ends, the apparatus comprising a bed for holding a plurality of bales and a loading assembly for lifting a bale and conveying it to the bed, the bed having a first end, second end and a lengthwise axis that extends through the first and second ends of the bed, the loading assembly having:
    a first arm comprising a first conveyor belt having:
       a leading angular portion that forms a first bale-engaging face with a lengthwise axis and a vertical axis; and
       a second portion having a lengthwise axis and a vertical axis, the lengthwise axis of the second portion being angled with respect to the lengthwise axis of the leading angular portion; and a second arm comprising a second conveyor belt having:
  a leading angular portion that forms a second bale-engaging face with a lengthwise axis and a vertical axis;
  a second portion having a lengthwise axis and a vertical axis, the lengthwise axis of the second portion being angled with respect to the lengthwise axis of the leading angular portion, the method comprising:
directing the apparatus toward a bale with the ends of the bale being perpendicular to the apparatus;
contacting the first bale-engaging face with a contour of the bale, the first arm extending downward from the bed and toward the surface on which the bales rest when the first bale-engaging face contacts the bale, the lengthwise axis of the first bale-engaging face forming an angle $\beta_1$ with the lengthwise axis of the bed when the first bale-engaging face contacts the bale, $\beta_1$ being less than about 30°, the vertical axis of the first bale-engaging face not being parallel or perpendicular to the surface on which the bale rests when the first bale-engaging face contacts the bale, the vertical axis of the second portion not being parallel or perpendicular to the surface on which the bale rests when the second portion contacts the bale;
contacting the second bale-engaging face with the contour of the bale, the second arm extending downward from the bed and toward the surface on which the bales rest when the second bale-engaging face contacts the bale, the lengthwise axis of the second bale-engaging face forming an angle $\beta_2$ with the lengthwise axis of the bed when the second bale-engaging face contacts the bale, $\beta_2$ being less than about 30°, the vertical axis of the second bale-engaging face not being parallel or perpendicular to the surface on which the bale rests when the second bale-engaging face contacts the bale, the vertical axis of the second portion not being parallel or perpendicular to the surface on which the bale rests when the second portion contacts the bale; and moving the first conveyor belt and second conveyor belt to lift the bale from the surface on which the bale rests and to convey the bale toward the bed.

13. The method as set forth in claim 12 wherein:
the vertical axis of the first bale-engaging face forms an angle $\theta_1$ with the surface on which the bale rests, $\theta_1$ being between about 10° and about 80° when the first bale-engaging face contacts the bale; and
the vertical axis of the second bale-engaging face forms an angle $\theta_2$ with the surface on which the bale rests, $\theta_2$ being between about 10° and about 80° when the second bale-engaging face contacts the bale.

14. The method as set forth in claim 13 wherein both $\theta_1$ and $\theta_2$ are between about 30° and about 60°.

15. The method as set forth in claim 13 wherein both $\theta_1$ and $\theta_2$ are between about 40° and about 50°.

16. The method as set forth in claim 12 wherein the bed comprises a bed conveyor, the method comprising activating the bed conveyor to transport the bale in the direction of the second end of the bed.

17. The method as set forth in claim 12 wherein the bed comprises a plurality of bed conveyors, the method comprising activating the bed conveyors to transport the bale in the direction of the second end of the bed.

18. The method as set forth in claim 12 wherein:
the lengthwise axis of the second portion of the first arm is parallel to the lengthwise axis of the bed; and
the lengthwise axis of the second portion of the second arm is parallel to the lengthwise axis of the bed.

* * * * *